Oct. 8, 1929.　　　　　W. JENNY　　　　　1,730,852
ANGLE AND HYPOTENUSE MEASURING INSTRUMENT
Filed May 28, 1926

Inventor:
Willy Jenny,
by Rippey & Kingsland,
His Attorneys.

Patented Oct. 8, 1929

1,730,852

UNITED STATES PATENT OFFICE

WILLY JENNY, OF HOUSTON, TEXAS, ASSIGNOR TO SHELL PETROLEUM CORPORATION, A CORPORATION OF VIRGINIA

ANGLE AND HYPOTENUSE MEASURING INSTRUMENT

Application filed May 28, 1926. Serial No. 112,258.

This invention relates to an angle and hypotenuse measuring instrument, and consists in the novel construction hereinafter disclosed.

An object of the invention is to provide an instrument for geometrical measurements and mathematical calculations, whereby the measurement of the hypotenuse of a right angle triangle may be made where the length of the base and altitude are known, and also for calculating the angle of the triangle between the altitude and hypotenuse; and for making derived calculations from the foregoing measurements.

Figure 1:
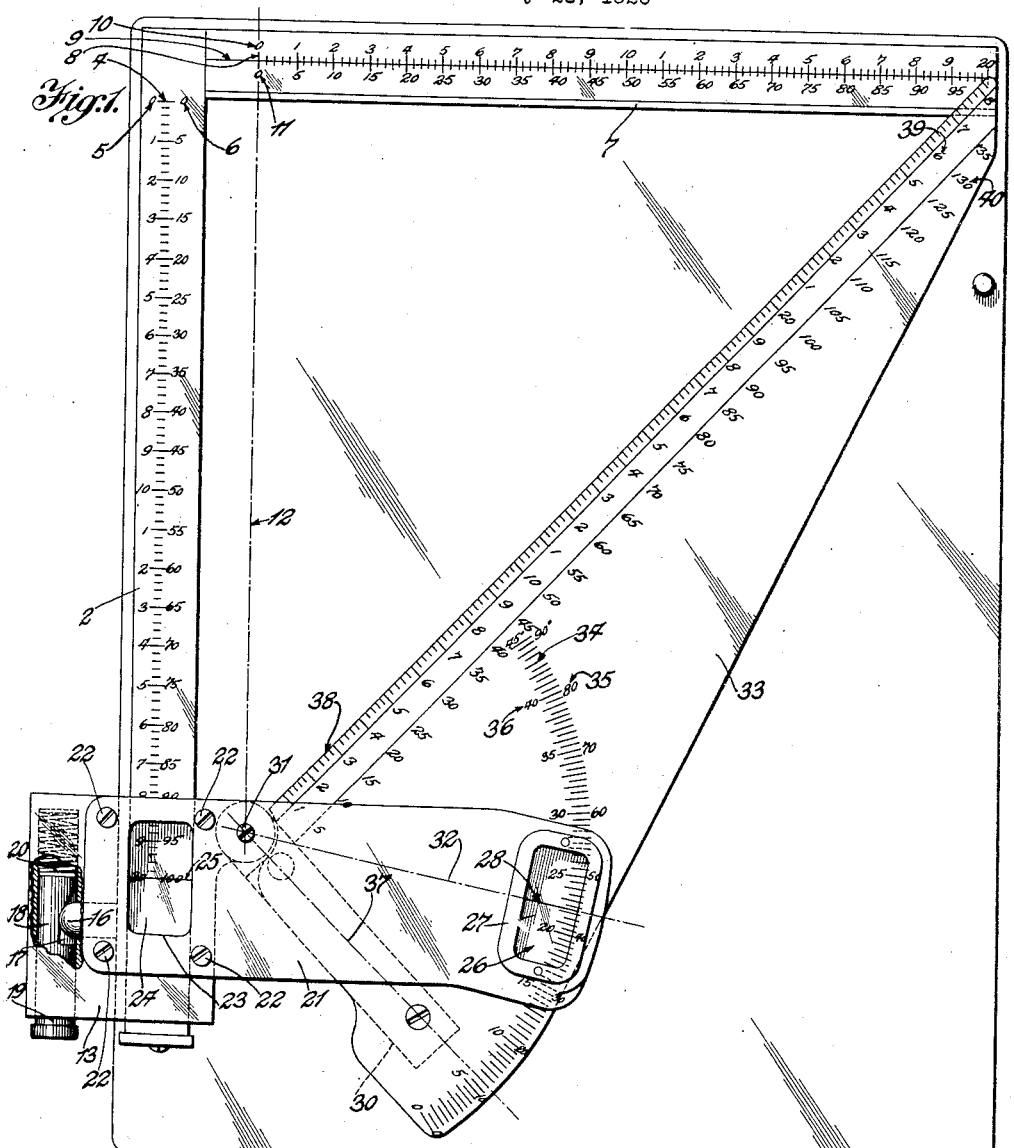

Additional advantages of the structure will be apparent from the following detailed description thereof, taken in connection with the accompanying drawing, in which, Fig. 1 is a plan view of the instrument.

Figure 2:
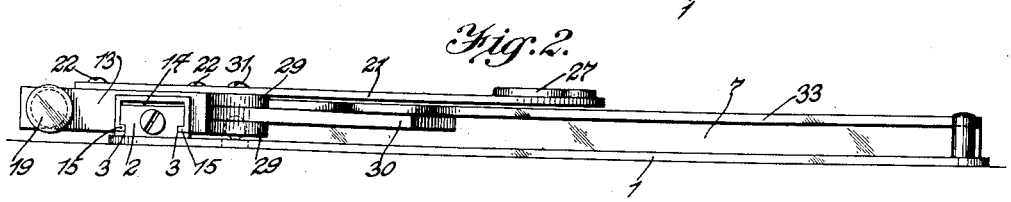

Fig. 2 is an end elevation.

In the embodiment of the invention illustrated in the drawing, the instrument is shown as including a base 1 in the form of a rectangular plate. At one side of the base and affixed thereto is a rail 2 having longitudinal grooves 3 in its side walls and adjacent to the bottom of the rail.

The upper face of the rail is provided with a scale 4 which is divided into any suitable units of measure, said scale having on each side thereof an index constituting the indices 5 and 6 respectively. The indices 5 and 6 are preferably displayed in a distinctive manner, and a suitable method of distinction is by making one of the indices of a color different from the other.

A longitudinal plate 7 of the same thickness as the rail 2 is affixed to the upper edge of the base 1 and extends at right angles thereto. Upon the top of the plate 7 is a scale 8 having a central indicating line 9 extending transversely of the scale line indications. The scale is divided into any suitable units of measure and is coordinated with two indices 10 and 11 respectively, said indices being preferably distinctively displayed and coordinated by distinctive color with the indices 5 and 6 respectively.

It will be noted that the initial point of the scale 8 lies within a plane indicated by the construction line 12, which plane is parallel to the plane of the rail 2, which, in effect, results in the translation of the scale 4 to a plane of the construction line 12 and permits the offsetting of the scale to facilitate the operation and reading of the device.

A sliding head 13 is arranged to be moved longitudinally on the rail 2, said head being provided with a channel 14 that fits over the rail 2, the lower wall of said channel having tongues 15 that seat in the grooves 3 and hold the head in absolute alinement with the rail.

Any suitable device may be provided to frictionally hold the head 13 in predetermined longitudinal adjustment in respect of the rail 2, which device is operable to release the engagement, permitting the free manual movement of the head to its adjustment. As shown in the drawing, the device for frictionally holding the head in adjustment includes a friction shoe in the form of a short rod 16 that operates in an opening transversely across the head 13 and at right angles to one vertical wall of the channel 14.

The outer end of the member 16 is rounded and seats in a cam slot 17 formed in the side of a plunger 18, which plunger is mounted in a cylindrical recess 19 in the head 13, which recess extends at right angles to the opening in which the member 16 operates. The plunger 18 is normally actuated outwardly by an expansion spring 20 which causes the high side of the cam slot to press the member 16 frictionally against the side of the rail 2, thereby holding the head 13 in adjustment frictionally with the rail.

A laterally extending plate 21 is attached to the upper face of the head 13 by screws 22. Said plate 21 has a cutout portion 23 that registers with the cutout portion in the upper wall of the head 13 over the upper face of the rail 2 upon which the scale 4 is carried. In the opening 23, there is a transparent panel 24 having a transverse line 25 that cooperates with the scale indications for the accurate adjustment of the head longitudinally of the rail 2. Near the outer extremity of the plate 21 is another opening 26 in which is set a panel 27 having a transverse line 28 that cooperates with a protractor scale, as will be fully explained hereinafter.

Near the upper inner corner of the head 13 there is provided a pair of spaced ears 29 constituting the leaves of a hinge support for a plate 30, said plate 30 having its inner end pivotally supported on a pin 31 that passes through the plate and through the ears 29. The plate 30 is free to swing upon the pin 31. The axis of the pin 31 lies upon the construction line 12 which is parallel with the rail 2 and a line 32 passing through the indicating line 28 converges with the line 12 with the pin 31 as a common center.

A protractor plate 33 is attached to the upper face of the plate 31, said protractor plate preferably made in the form clearly being illustrated in Fig. 1, that is to say, having a general tapering form with the base extended sufficiently to provide a space for the display of a protractor scale 34 which is upon an arc struck from the pin 31 as a center. The protractor scale is divided into units of measure indicating degrees and is appropriately marked by indicia 35, with a separate distinctive indicia 36 to indicate the bisection of the true angle, which scale is useful for direct data in certain formulæ in mathematical calculations.

It will be noted that, because of the fact that the protractor scale is offset from the working face of the protractor plate 33, compensation for the positioning of the protractor scale must be effected, which is done by advancing the arc of the protractor scale a sufficient number of degrees to compensate for the displacement of the scale.

The construction line 37 is a line that is perpendicular to the working face of the protractor plate. It will be noted that the relation of the line 37 to the protractor scale is advanced a number of figures from the zero of said scale, the extent of advancement being the correction figure for the offsetting of a horizontal line through the pivot 31, so that when the protractor scale is set at zero on the indicating line 28, it will indicate by correction the theoretical intersection of a horizontal line through the pivot point 31. The protractor plate also carries the hypotenuse scale 38 divided into selected units of measure and appropriately coordinated with distinctive indices 39 and 40. Since the indices 39 and 40 are developed from an initial point on the axis of the offset pin 31, the necessary correction is made so that the direct reading of the scale will be from the theoretical initial point on the scale 4.

It will be readily understood from the foregoing description that, by coordinating the scales on the protractor plate to relate the actual center or pivot of the protractor plate to the theoretical center on the scale 4, the readings may be directly made both on the hypotenuse scale and the protractor scale. By setting the head 13 at the predetermined point on the scale 4 and then moving the free end of the protractor plate to the predetermined point on the scale and by offsetting the actual center of the protractor pivot and relating the scales to the theoretical center, the adjustment of the protractor plate is facilitated and the readings may be conveniently taken on the hypotenuse scale and also on the protractor scale to determine both the length of the hypotenuse and the angle formed between the hypotenuse and the vertical leg of the triangle.

From the direct readings thus possible with the instrument, other derived data may be readily obtained. It will be readily understood, therefore, that the instrument is adapted to accurate mathmetical work for various purposes.

I am aware that the invention may be modified in various particulars without departing from the spirit and scope thereof, but what I claim and desire to secure by Letters Patent is:—

1. In a device of the class described, the combination of an angle member having scales thereon disposed at right angles to each other, of a head longitudinally adjustable on and along one leg of said angle member, a transparent panel carried by said head having an index line coordinating with the scale on said leg, a protractor plate having a straight edge pivoted to said head there being a protractor scale carried by said plate, a member rigid with the head, and a transparent panel carried by said member having an indicating line coordinating with the protractor scale whereby the angle formed by the straight edge of the protractor plate with said angle member may be directly indicated.

2. In a device of the class described, the combination of an angle member comprising two intersecting legs disposed at right angles to each other each bearing a scale having its point of beginning offset from the intersection of said legs, with a head slidable on one leg of the angle member having a reading line for reading the scale on said leg, a protractor plate pivoted on the head having its pivot offset laterally from the edge of the adjacent leg and longitudinally from the reading line, there being a protractor scale and a longitudinal scale carried by said plate, said two last named scales being coordinated to give a direct reading with the scale on the leg opposite to the one on which the head is slidable.

3. In a device of the class described, the combination of an angle member comprising intersecting legs having scales thereon said legs being disposed at right angles and having the points of beginning of their scales offset from the intersection of said legs, of a head longitudinally adjustable on and along one of said legs, a transparent panel carried by said head having a reading line coordinated with the scale on said leg, a protractor plate pivoted to the head, the pivot point of said plate being disposed laterally of the leg upon which the head is mounted and offset along said leg from said reading line, there being a protractor scale carried by said plate, a member rigid with the head, and a transparent panel carried by said member having a reading line coordinated with the protractor scale.

4. In a device of the class described the combination with an angle member comprising intersecting legs connected at right angles and having scales thereon which have their point of beginning offset from the intersection, of a head slidable on and along one leg, said head being provided with an index coordinating with the scale on the leg upon which the head is mounted, a protractor plate pivoted to the head, the pivot for said plate being offset laterally from the leg mounting said head and along said leg from the index, said plate carrying a protractor scale, and a member rigid with the head having an index coordinated with the protractor scale.

5. In a device of the class described, the combination with an angle member comprising two intersecting legs carrying scales, said legs being disposed normal to each other and rigidly connected together, said scales being arranged on said legs so that their point of beginning is spaced from the intersection thereof, of a head slidable on and along one of said legs having an index thereon for reading the scale on said legs, a protractor plate connected to the head and having its pivot point offset laterally from the edge of the leg and offset longitudinally along the leg from the index member, said protractor plate having a protractor scale thereon and a longitudinal scale along one straight edge thereof, said scale having its zero point at the pivot point.

WILLY JENNY.